United States Patent
Uejima et al.

(10) Patent No.: US 7,630,743 B2
(45) Date of Patent: Dec. 8, 2009

(54) PORTABLE WIRELESS DEVICE

(75) Inventors: Hiroyuki Uejima, Ishikawa (JP); Daigo Imano, Miyagi (JP); Takeshi Yamaguchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 11/570,974

(22) PCT Filed: Jun. 29, 2006

(86) PCT No.: PCT/JP2006/312961

§ 371 (c)(1),
(2), (4) Date: Dec. 20, 2006

(87) PCT Pub. No.: WO2007/004499

PCT Pub. Date: Jan. 11, 2007

(65) Prior Publication Data

US 2009/0170570 A1 Jul. 2, 2009

(30) Foreign Application Priority Data

Jun. 30, 2005 (JP) ............................... 2005-191435

(51) Int. Cl.
*H04M 1/00* (2006.01)
(52) U.S. Cl. ................ 455/575.3; 455/90.3; 455/550.1; 455/575.1; 455/575.7; 343/700 MS
(58) Field of Classification Search .............. 455/575.3, 455/575.1, 90.3, 550.1, 575.7, 556.1, 562.1, 455/575.4, 575.5, 128–129, 347; 343/700 MS, 343/702, 767
See application file for complete search history.

(56) References Cited

U.S. PATENT DOCUMENTS

| 5,760,746 | A | * | 6/1998 | Kawahata | .................... 343/702 |
| 6,707,427 | B2 | * | 3/2004 | Konishi et al. | ........ 343/700 MS |
| 6,946,997 | B2 | * | 9/2005 | Yuanzhu | .............. 343/700 MS |
| 7,075,483 | B2 | * | 7/2006 | Okado | ................. 343/700 MS |

FOREIGN PATENT DOCUMENTS

| JP | 2001-320459 | 11/2001 |
| JP | 2001-326524 | 11/2001 |
| JP | 2002-246822 | 8/2002 |
| JP | 2002-353719 | 12/2002 |
| JP | 2003-283225 | 10/2003 |
| JP | 2004-007243 | 1/2004 |
| JP | 2004-186970 | 7/2004 |
| JP | 2004-328346 | 11/2004 |
| JP | 2005-286895 | 10/2005 |
| JP | 2006-050496 | 2/2006 |

* cited by examiner

*Primary Examiner*—Pablo N Tran
(74) *Attorney, Agent, or Firm*—Pearne & Gordon LLP

(57) ABSTRACT

A portable wireless device is formed of a lower housing and an upper housing coupled together by a hinged section, which makes the device foldable. A lower circuit board is coupled to an upper circuit board by a flexible cable, which is placed away from a power feeder of an antenna element with a given space and near the hinged section along the width direction of this foldable device. An end of conductive element is shorted to the lower circuit board with a shorting conductor near a connector which couples the flexible cable to the lower circuit board. The foregoing structure allows the portable and foldable wireless device to reduce an amount of energy supposed to be absorbed into a temporal region of a human body while the electric power of the transmitted radio wave is maintained during a phone conversation.

6 Claims, 5 Drawing Sheets

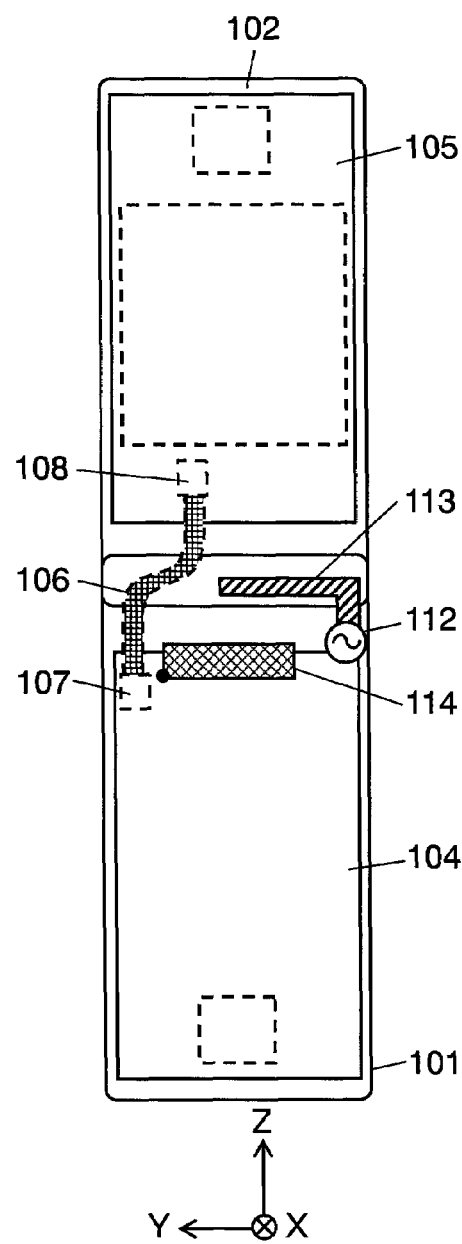
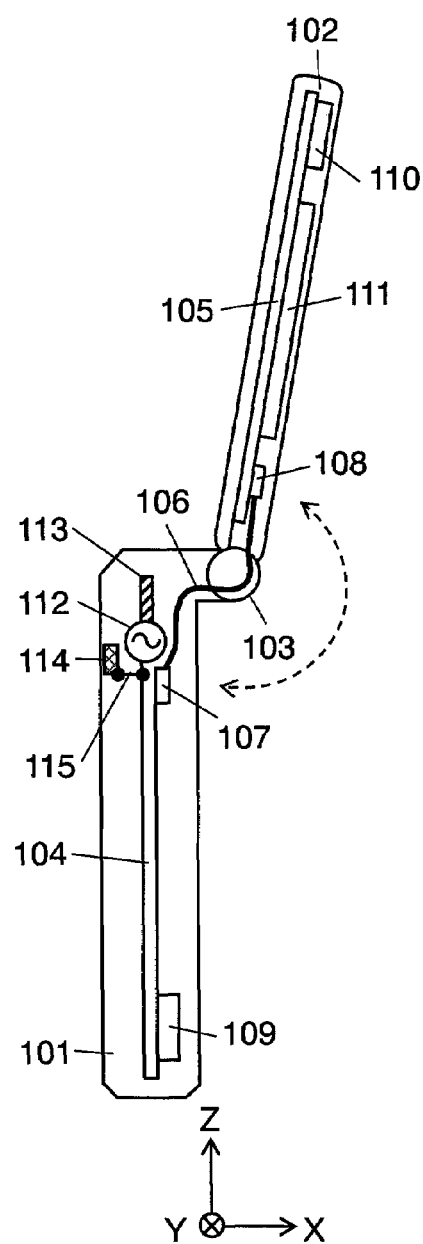
FIG. 1A
FIG. 1B

PORTABLE WIRELESS DEVICE

This application is a national phase application of PCT International Application No. PCT/JP2006/312961.

TECHNICAL FIELD

The present invention relates to a portable wireless device of which upper housing is coupled in a foldable/unfoldable manner to its lower housing by a hinged section.

BACKGROUND ART

Portable phones have been widely accepted in the market, and various types of portable phones have been developed. Among these types, a compact and double-backed type is widely used. When the phone is not used, this double-backed type can be folded (double-backed) to be more compact.

The law effective since Jun. 2002 regulates the average amount of energy of radio wave transmitted from wireless devices such as a portable phone while a phone call is in progress. The law defines the average amount of energy (Specific Absorption Rate, hereinafter referred to as SAR) absorbed for six minutes into a specific portion (particularly to temporal region) of human body. It is thus required that the SAR be reduced to an amount not higher than a regulated amount.

Reduction of the SAR needs to reduce the electric power of radio wave radiated from the wireless device; however, the reduction of the power lowers the quality of a phone conversation.

Methods of reducing the SAR and yet maintaining the electric power radiated from wireless devices is disclosed in, e.g. Unexamined Japanese Patent Publication No. 2001-320459, and No. 2004-328346. The portable phones disclosed in the foregoing publications have the following structure: an upper housing and a lower housing of the portable phone are unfolded for starting conversation. In synchronization with this unfolding, a rod antenna falls down apart from the temporal region of the user, so that a peak of antenna current can be isolated from the temporal region for reducing the SAR. FIG. 5 shows a perspective view illustrating a conventional portable phone. In FIG. 5, the lower housing (not shown) includes antenna element 113, power feeder 112, lower circuit board 104 and the like. The upper housing (not shown) includes upper circuit board 105, flexible cable 106 and the like.

Running through a hollow section of the hinged section, flexible cable 106 is obliged to become close to the temporal region during a phone conversation. In the 2 GHz bandwidth employed in CDMA method, the peak of the antenna current exists not only in power feeder 112 but also it can exist in flexible cable 106. The distribution of antenna current changes, in general, in response to SAR, so that it is known that the presence of the peak of the antenna current in the temporal region increases the SAR. In other words, closer placement to the temporal region of flexible cable 106, in which the peak of antenna current exists, invites the higher SAR. The conventional method has thus encountered a difficult problem of reducing the SAR.

DISCLOSURE OF INVENTION

The present invention addresses the foregoing problem, and a portable wireless device of the present invention comprises the following elements:

- a hinged section for coupling a first housing to a second housing and allowing these housings to be folded and unfolded;
- a first circuit board placed at the first housing;
- a second circuit board placed at the second housing;
- a wiring bundle formed of a plurality of conductive cables connecting the first circuit board to the second circuit board;
- a power feeder placed at an end along the width direction on the first circuit board near to the hinged section;
- an antenna element placed at the first housing and fed by the power feeder;
- a conductive element having a given length; and
- a shorting conductor coupled to an end of the conductive element.

The joint section between the wiring bundle and the first circuit board is placed away from the power feeder with a given space along the width direction of the portable wireless device. The conductive element is shorted to the first circuit board via the shorting conductor, and placed near the joint section between the wiring bundle and the first circuit board.

The foregoing structure allows the portable wireless device to obtain high radiation efficiency with the upper housing and the lower housing unfolded for carrying out a phone conversation. The peak of antenna current existing in the wiring bundle (flexible cable) close to the temporal region of a human body can be dispersed. The Specific Absorption Rate (SAR) can be thus lowered, and a bandwidth can be widened by compound resonance.

The portable wireless device of the present invention thus disperses the peak of antenna current existing in the flexible cable close to the temporal region of a human body during a phone conversation, so that the SAR can be lowered.

BRIEF DESCRIPTION OF DRAWINGS

FIG. 1A shows a rear view of a portable phone in accordance with a first embodiment of the present invention.

FIG. 1B shows a lateral view of the portable phone in accordance with the first embodiment of the present invention.

Figure 2:
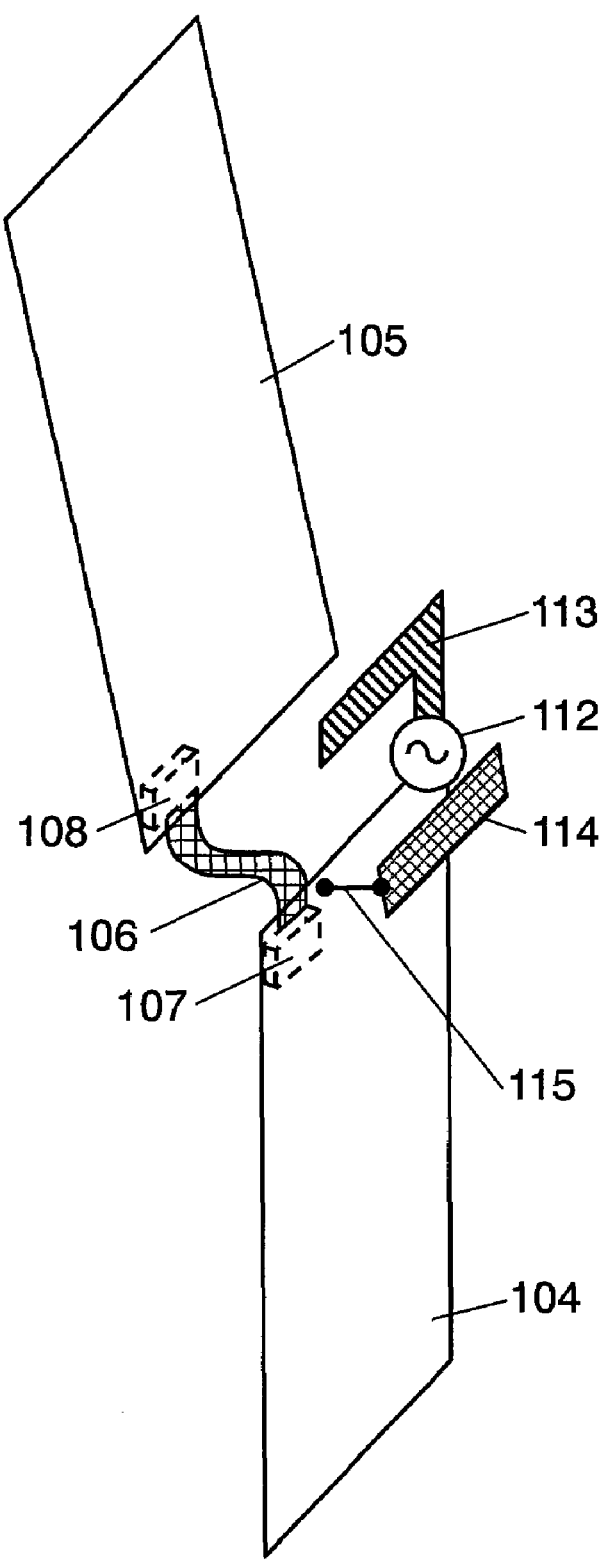
FIG. 2 shows a perspective view illustrating a main portion of the portable phone in accordance with the first embodiment of the present invention.

DESCRIPTION OF REFERENCE MARKS 101 lower housing (first housing)
102 upper housing (second housing)
103 hinged section
104 lower circuit board (first circuit board)
105 upper circuit board (second circuit board)
106 flexible cable (wiring bundle)
107, 108 coupling connector (joint section)
109 mouthpiece
110 earpiece
111 liquid crystal display (LCD)
112 power feeder 113 antenna element
114 conductive element
115 shorting conductor

DESCRIPTION OF PREFERRED EMBODIMENT

Preferred embodiments of the portable wireless device of the present invention are demonstrated hereinafter with reference to the accompanying drawings.

Exemplary Embodiment 1

Figure 3:
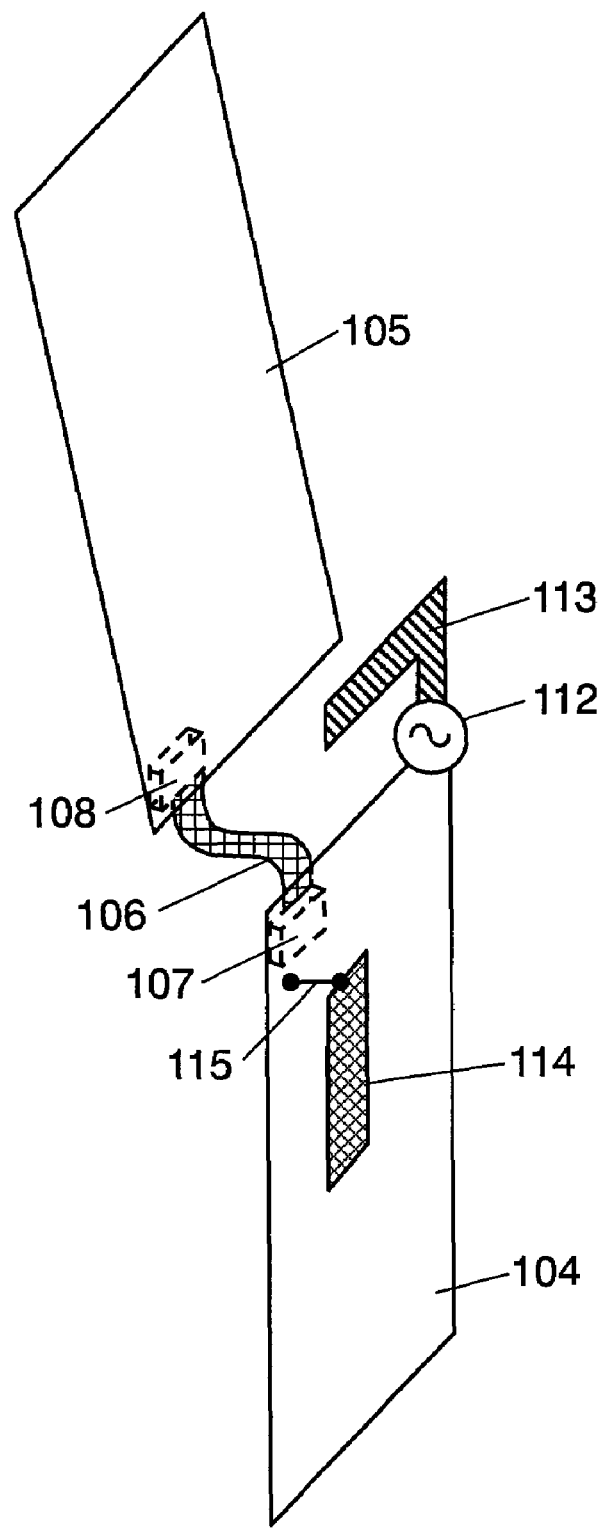
FIG. 3 shows a perspective view illustrating a main portion of another portable phone in accordance with the first embodiment of the present invention.
Figure 4:
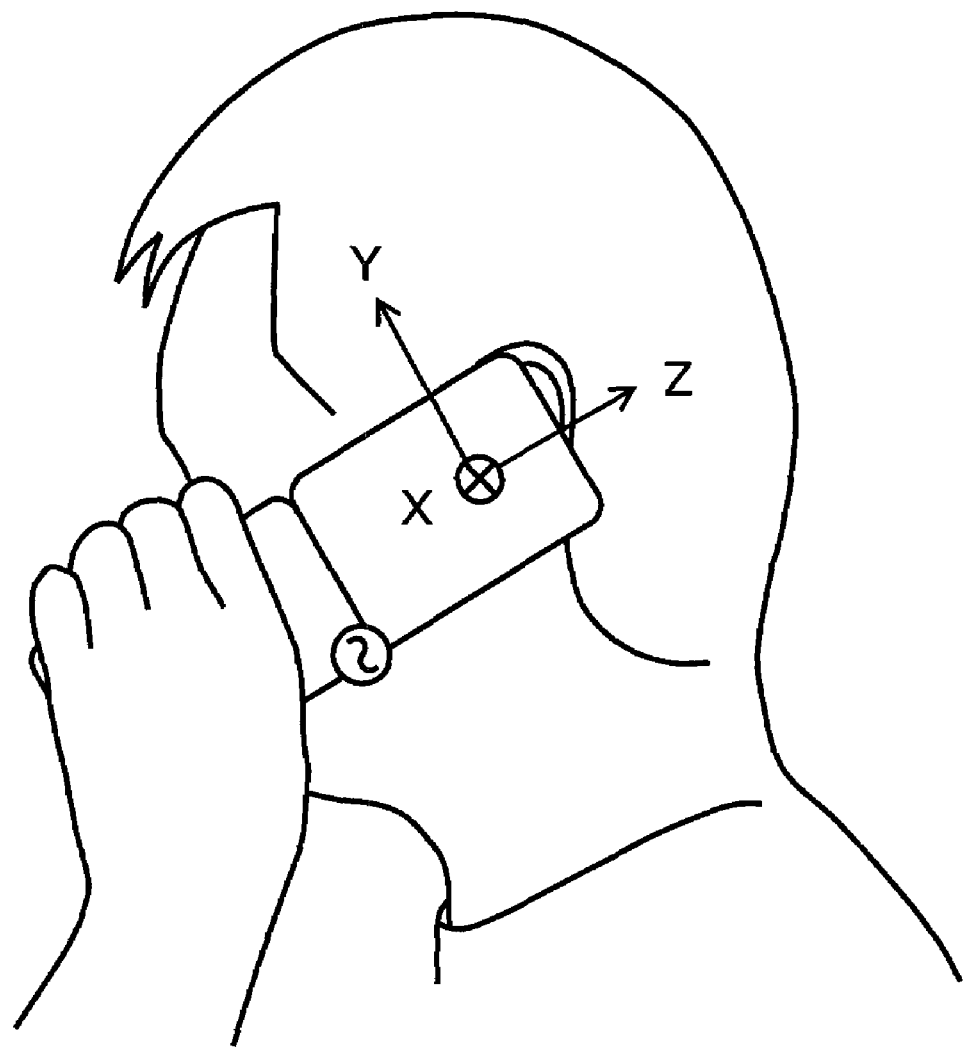
FIG. 4 schematically illustrates the portable phone, in accordance with the first embodiment of the present invention, during the progress of a phone conversation.
Figure 5:
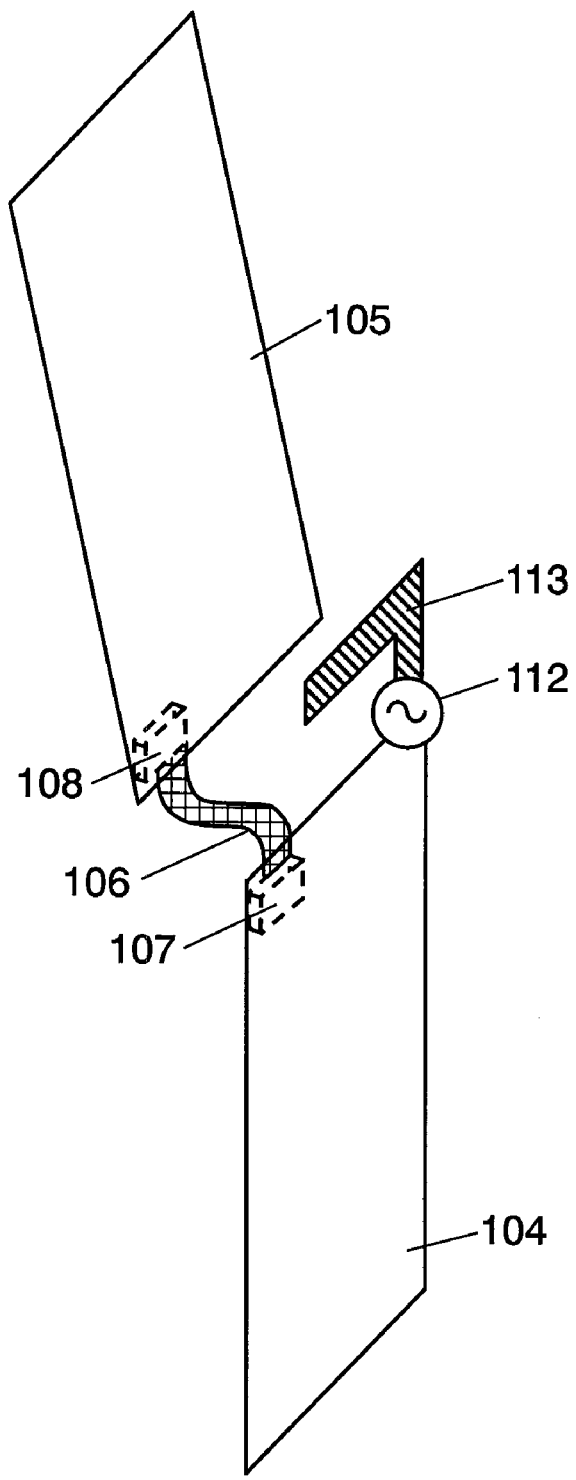
FIG. 5 shows a perspective view illustrating a main portion of a conventional portable phone.

FIG. 1A shows a rear view of a portable wireless device in accordance with the first embodiment of the present invention. FIG. 1B shows a lateral view of the portable wireless device in accordance with the first embodiment of the present invention. FIG. 3 shows a perspective view illustrating a main portion of another portable phone in accordance with the first embodiment of the present invention. FIG. 4 schematically illustrates the portable phone, in accordance with the first embodiment, during the progress of a phone call.

In FIGS. 1 and 2, the portable phone in accordance with the first embodiment includes a foldable mechanism which couples lower housing 101 to upper housing 102 with hinged section 103. Lower housing 101 accommodates antenna element 113, power feeder 112 and lower circuit board 104. Antenna element 13 has a length of approx. a quarter of wavelength of the frequency presently used. Antenna element 13 is bent and shapes like letter "L". Power feeder 12 powers antenna element 13. Lower circuit board 104 includes a ground pattern which covers almost all the inner face of lower housing 101, and the ground pattern works as a conductive pattern having a grounding potential.

Lower housing 101 has mouthpiece (microphone) 109 and others on its front face. Upper housing 102 has LCD (liquid crystal display) 111 for displaying letters, and earpiece (speaker) 110 on its front face.

Flexible cable 106 is a wiring bundle formed of plural signal cables and grounding cables. These signal cables electrically couple the circuit components such as LCD 111 and earpiece 110, which are connected to or mounted to upper circuit board 105 placed inside of the upper housing 102, to the circuit components typically represented by a control circuit (not shown) which is connected or mounted to lower circuit board 104 placed inside the lower housing 102. A first end of flexible cable 106 is connected to lower circuit board 104 with connector 107, and a second end thereof is connected to upper circuit board 105 with connector 108.

Lower and upper circuit boards 104 and 105 generally have a width of approx. 40 mm and a length of approx. 80 mm. Flexible cable 106 has a width of approx. 5 mm and length of approx. 40 mm. Connectors 107 and 108 are placed away from power feeder 112 of antenna element 113 by a certain distance, e.g. 30 mm along the width direction of the portable phone and near to hinged section 103.

In addition to the preceding elements, conductive element 114 and shorting conductor 115 are also provided to lower housing 101. Conductive element 114 is longitudinally in parallel with the width direction of lower circuit board 104, and has a given length of, e.g. 25 mm, widthwise. Shorting conductor 115 has a length of 5 mm, and shorts conductive element 114 to lower circuit board 104. The width of conductive element 114 and shorting conductor 115 is, e.g. 2 mm. A first end of conductive element 114 is shorted by using shorting conductor 115 near connector 107 which couples flexible cable 106 to lower circuit board 104, i.e. on the other side of power feeder 112 of antenna element 113 on lower circuit board 104 along the width direction. To be more specific, the first end of conductive element 114 is shorted by using shorting conductor 115 near to hinged section 103 and away from power feeder 112 of antenna element 113 by, e.g. 30 mm.

An operation of the antenna of the portable phone discussed above is demonstrated hereinafter. In the following description, 2 GHz band employed in CDMA method is used as an operating frequency of the antenna.

When lower housing 101 and upper housing 102 are folded, antenna element 113 works as a monopole antenna having a quarter of the wavelength. When housings 101 and 102 are unfolded, antenna element 113 works as a resonating element which resonates a conductive pattern, namely, the ground pattern, having a grounding potential and provided on upper circuit board 105. Circuit boards 105 and 104 work as a dipole antenna by using the ground pattern on circuit board 105 and the ground pattern on circuit board 104 as radiating elements. This dipole antenna has a width over a quarter of the wavelength and a length over one wavelength. At this time, connectors 107 and 108 between flexible cable 106 and lower circuit board 104, and between flexible cable 106 and upper circuit board 105 are placed on the other side of power feeder 112 along the width direction of the portable phone. This placement allows increasing a radiation resistance, thereby obtaining high radiant efficiency.

If there is no conductive element 114 or shorting conductor 115, there could be some place, of which electrical length becomes equal to a half of the wavelength, on the route running from power feeder 112 to the upper end of lower circuit board 104 near hinged section 103. Thus the antenna current concentrates on flexible cable 106 close to the temporal region of a human body during a phone conversation as shown in FIG. 4, thereby inviting a higher SAR (Specific Absorption Rate).

Considering the foregoing situation, conductive element 114 and shorting conductor 115, of which electrical length is approx. a quarter of the wavelength, are prepared, so that the antenna current running through flexible cable 106 can be dispersed to conductive element 114 and shorting conductor 115. An appropriate length of conductive element 114 will reduce the SAR by approx. 20%. In this case, the total electrical length from power feeder 112 to the ends of shorting conductor 115 and conductive element 114 via the upper end of lower circuit board 104 near hinged section 103 is approx. a half of the wavelength. Adding an electrical length of antenna element 113 to the foregoing total electrical length makes the electrical length approx. three quarters of the wavelength. When the electrical length falls into a range from a half of the wavelength to one wavelength, the SAR can decrease by approx. 5% or more.

Employment of conductive element 114 and shorting conductor 115 also allows generating compound resonance, so that the bandwidth can be widened both in folded and unfolded conditions of lower housing 101 and upper housing 102.

As discussed above, the first embodiment of the present invention proves that the placement of connectors 107 and 108 on the other side of power feeder 112 along the width direction of the portable phone allows increasing radiant resistance, thereby obtaining high radiant efficiency. Connectors 107 and 108 couple flexible cable 106 to lower circuit board 104, and cable 106 to upper circuit board 105 respectively.

An end of conductive element 114 is shorted, by using shorting conductor 115 near connector 107 which couples flexible cable 106 to lower circuit board 104, i.e. on the other side of power feeder 112 of antenna element 113 on lower circuit board 104 along the width direction. This structure allows dispersing the peak of antenna current on flexible cable 106, thereby reducing the SAR. It can be concluded that the employment of conductive element 114 and shorting conductor 115 generates the compound resonance and widens the bandwidth as well.

In the first embodiment discussed above, bent antenna element 113 is used; however, any antenna element as far as it makes use of the ground pattern of lower circuit board 104, such as a helical antenna or a telescopic antenna, can expect a similar advantage to what is discussed previously.

The first embodiment quotes various numbers such as sizes of lower and upper circuit boards 104 and 105 in the width direction, a distance between flexible cable 106 and power feeder 112, a length of flexible cable 106; however, the present invention is not limited to these numbers. For instance, if the distance between flexible cable 106 and power feeder 112 is 20 mm or more than 20 mm, the SAR can be advantageously reduced.

Appropriate lengths of conductive element 114 and shorting conductor 115 in response to the electrical length of antenna element 113 and that of the ground pattern extending from power feeder 112 to shorting conductor 115 on lower circuit board 104 will allow reducing the SAR. When a sum of the electrical length of antenna element 113 and an electrical length extending from power feeder 112 to both the ends of shorting conductor 115 and conductive element 114 via the upper end of lower circuit board 104 near hinged section 103 is longer than a half of the wavelength and not longer than one wavelength, the SAR can be reduced. When the foregoing sum of the electrical length is set at approx. three quarters of the wavelength, the SAR can be further reduced.

Conductive element 114 may be formed of a conductive pattern (not shown) on a sub circuit board (not shown) different from lower circuit board 104, and shorting conductor 115 can be formed of a connector (not show) between lower circuit board 104 and the sub circuit board. This structure can advantageously reduce SAR as well.

Conductive element 114 and shorting conductor 115 are not limited to discrete components, and they may be integrated into one unit, with a similar advantage to what is discussed above.

Lower circuit board 104, conductive element 114, and shorting conductor 115 may be integrated into one unit, with a similar advantage to what is discussed above.

Conductive element 114 and shorting conductor 115 may be formed with a conductive pattern of lower circuit board 104 in one plane, with a similar advantage to what is discussed above.

FIG. 3 shows another portable phone in accordance with the first embodiment of the present invention, and conductive element 114 is situated approx. in parallel with the longitudinal direction of this portable phone. The longitudinal direction of conductive element 114 is not always in parallel with the width direction of the portable phone, but as shown in FIG. 3, it can be in parallel with the longitudinal direction of the portable phone, and this structure can also reduce the SAR.

INDUSTRIAL APPLICABILITY

A portable wireless device of the present invention allows reducing SAR (Specific Absorption Rate) without lowering radiated electric power, so that the device can assure quality phone-conversation in progress. The portable wireless device is thus useful for portable phones or the like.

The invention claimed is:

1. A portable wireless device comprising:
   a first housing;
   a second housing;
   a hinged section for coupling the first housing to the second housing and allowing the first and the second housings to be foldable and unfoldable;
   a first circuit board placed at the first housing;
   a second circuit board placed at the second housing;
   a wiring bundle formed of a plurality of conductive cables that couple the first circuit board to the second circuit board;
   a power feeder placed at an end of the first circuit board in a width direction and near the hinged section;
   an antenna element powered by the power feeder and placed at the first housing;
   a conductive element having a given length; and
   a shorting conductor coupled to an end of the conductive element, wherein a connector between the wiring bundle and the first circuit board is placed away from the power feeder by a given distance along the width direction of the first circuit board, and the conductive element is shorted to the first circuit board at a place near the connector via the shorting conductor.

2. The portable wireless device of claim 1, wherein the first housing includes a mouthpiece and the second housing includes a earpiece.

3. The portable wireless device of claim 1, wherein a sum of an electrical length of the antenna element, an electrical length extending from the power feeder to the connector, an electrical length of the shorting conductor, and an electrical length of the conductive element is longer than a half of a wavelength of a frequency presently used and not longer than one wavelength of the frequency.

4. The portable wireless device of claim 1, wherein a sum of an electrical length of the antenna element, an electrical length extending from the power feeder to the connector, an electrical length of the shorting conductor, and an electrical length of the conductive element is approximately three quarters of a wavelength of a frequency presently used.

5. The portable wireless device of claim 2, wherein a sum of an electrical length of the antenna element, an electrical length extending from the power feeder to the connector, an electrical length of the shorting conductor, and an electrical length of the conductive element is longer than a half of a wavelength of a frequency presently used and not longer than one wavelength of the frequency.

6. The portable wireless device of claim 2, wherein a sum of an electrical length of the antenna element, an electrical length extending from the power feeder to the connector, an electrical length of the shorting conductor, and an electrical length of the conductive element is approximately three quarters of a wavelength of a frequency presently used.

* * * * *